United States Patent [19]
Woodhall et al.

[11] Patent Number: 5,603,992
[45] Date of Patent: Feb. 18, 1997

[54] COMPOSITIONS AND METHODS FOR THE TEMPORARY PROTECTION OF ACTIVATED SURFACES

[75] Inventors: Edward W. Woodhall, Los Altos; Ronald Swidler, Palo Alto, both of Calif.

[73] Assignee: Cal West Equipment Company, Inc., Sunnyvale, Calif.

[21] Appl. No.: 423,401

[22] Filed: Apr. 18, 1995

[51] Int. Cl.$^6$ ........................................... B05D 3/06
[52] U.S. Cl. ........................ 427/534; 427/536; 427/544; 427/155
[58] Field of Search ..................... 427/155, 154, 427/534, 536, 544

[56] References Cited

U.S. PATENT DOCUMENTS

| | | | |
|---|---|---|---|
| 1,551,495 | 8/1925 | Lionne | 427/155 |
| 3,034,915 | 5/1962 | Kornbluth | 427/155 |
| 3,455,712 | 7/1969 | Webb | 106/157 |
| 3,476,575 | 11/1969 | Arnold | 106/2 |
| 3,819,394 | 6/1974 | Schnebel, Jr. et al. | 117/6 |
| 3,839,066 | 10/1974 | Brenner | 117/6 |
| 3,853,576 | 10/1974 | Netznik | 117/515 |
| 4,009,076 | 2/1977 | Green et al. | 195/63 |
| 4,325,745 | 4/1982 | Milevski | 134/4 |
| 4,632,848 | 12/1986 | Gosset et al. | 427/154 |
| 5,028,350 | 7/1991 | Marsek | 252/88 |
| 5,143,949 | 9/1992 | Grogan et al. | 523/334 |
| 5,201,946 | 4/1993 | Marsek | 106/208 |
| 5,302,413 | 4/1994 | Woodhall et al. | 427/154 |
| 5,308,647 | 5/1994 | Lappi | 427/154 |
| 5,330,564 | 7/1994 | Geke et al. | 106/2 |
| 5,418,006 | 5/1995 | Roth et al. | 427/154 |
| 5,429,839 | 7/1995 | Graiver et al. | 427/155 |

FOREIGN PATENT DOCUMENTS

| | | | |
|---|---|---|---|
| 2391784 | 1/1979 | France . | |
| 249930 | of 1926 | United Kingdom | 427/155 |
| 344453 | 3/1931 | United Kingdom | 427/155 |
| 707488 | 4/1954 | United Kingdom . | |

*Primary Examiner*—Shrive Beck
*Assistant Examiner*—Erma Cameron
*Attorney, Agent, or Firm*—Townsend and Townsend and Crew LLP

[57] ABSTRACT

This invention provides methods and compositions for the temporary protection of activated plastic surfaces. The methods involve application of protective coating compositions to activated surfaces thereby protecting the surfaces from oxidation, soiling and mechanical damage. The coatings may be easily washed off leaving a clean activated surface suitable for overcoating.

21 Claims, No Drawings

COMPOSITIONS AND METHODS FOR THE TEMPORARY PROTECTION OF ACTIVATED SURFACES

FIELD OF THE INVENTION

The present invention relates to the field of protective coatings to be used to protect activate surfaces from soiling, oxidation and which damage during manufacturing operations. More significantly, in one embodiment, the invention provides an improved method and composition for temporarily protecting the activate surfaces of various plastics during various assembly operations.

BACKGROUND OF THE INVENTION

Because of their low cost, light weight and ease of manufacture, polymeric (plastic) components are rapidly replacing metal components in a wide variety of contexts ranging from shoehorns to automobile components. Notably, the development of high strength, impact resistant plastics and the ability to provide scratch and scuff resistant high gloss surface finishes plastics are replacing metal components in many contexts where the components are subject to considerable mechanical forces. Thus, for example, plastic components are being used with increasing frequency as bearings, automobile body panels, bumpers, and the like.

Plastics are frequently overcoated with various compositions to achieve particular surface properties. Such overcoatings include, but are not limited to, acrylic paints to provide color and a high-gloss finish, metallic or ceramic plating compositions, lubricants, adhesives, anti-fog compositions, and the like.

Achieving effective overcoating of a plastic typically requires that the overcoating composition easily wet the underlying plastic. Especially where the plastic is non-polar (e.g. ABS, polyethylene, polypropylene, etc.) the plastic is often activated to produce a wettable surface and/or to provide reactive sims for the bonding of the overcoating.

Plastic surface activation is accomplished by a wide number of means well known to those of skill in the art including corona discharge, radio-frequency exposure, microwave exposure, plasma treatment, microwave-plasma treatment and various chemical methods. Once activated, the surface must typically be overcoated relatively rapidly. Any soiling, e.g. by dirt, grease, oil or other materials may interfere with the even coating and bonding of the overcoating composition. In addition, the surface may only remain activated for a short period of time as the activated functional groups in the plastic may react with any chemical species (e.g., oxygen) in the immediate environment. Finally, particularly where the overcoating provides mechanical protection (e.g. hardness, scuff resistance, etc.) the overcoating must be applied before the vulnerable underlying plastic suffers any mechanical damage.

SUMMARY OF THE INVENTION

The present invention provides compositions and methods that protect an activated plastic surface. The method includes the steps of applying a substantially continuous film of a protective coating composition to an activated plastic surface (e.g. a plastic surface such as the surface of an automobile bumper exposed to corona discharge, radio frequency field, plasma and the like). The component bearing the activated plastic surface may then be stored, shipped, and handled in standard manufacturing operations. When it is desired to apply an overcoating (e.g. paint or plating) to the activated surface, the protective coating is removed from the surface by washing with water. These steps may be performed, for example, during an assembly line production of a vehicle or other article of manufacture.

The protective coating affords the activated surface a longer "shelf-life" before the overcoating must be applied and/or helps assure that the activated surface remains in pristine condition prior to the overcoating process.

The coating composition, in one embodiment, includes a film former (e.g. dextrin, starch, derivatized starch, cellulose, derivatized cellulose, etc.), a plasticizer, and water and lacks a surfactant. The film-former ranges from about 5 to about 60 percent, preferably from about 10 to about 50 percent, more preferably from about 20 to about 40 percent, and most preferably about 30 percent, by weight, of the total composition. The plasticizer preferably ranges from about 1 to about 50 percent, more preferably from about 15 to about 40 and most preferably about 30 percent, by weight, of the total composition. The remainder is typically water.

In one particularly preferred embodiment, the composition includes about 10 percent, by weight, film-former (preferably dextrin), about 1.5%, by weight glycerine, and remainder water. In a second preferred embodiment, the composition includes about 40 percent, film-former (preferably dextrin), about 30 percent, by weight glycerine, and remainder water.

These compositions may additionally include a thickener. The thickener preferably amounts to about 0.1 to about 2.0 percent, more preferably about 0.3 to about 1.0 percent, and most preferably about 0.6 percent, by weight, of the total composition. In a preferred embodiment the thickener is either hydroxyethyl cellulose (e.g. Cellosize™) or acrylic polymer emulsion (e.g. EP-1) at about 0.6 percent, by weight of the total composition.

In yet another preferred embodiment, the composition includes a surfactant in addition to the thickener. The surfactant is preferably present in an amount up to about 2 percent, more preferably up to about 1 percent, and most preferably about 0.1 percent, by weight of the total composition.

While the above-described methods and coatings are particularly preferred for protection of activated surfaces, they may also be used for protection of normal (unactivated) surfaces. Although the compositions and methods will afford protection against oxidation, they will most typically be used on normal surfaces to afford mechanical protection and protection against soiling.

Unless stated otherwise, and of course except when referring to water or other liquid components, all weight percentages herein, refer to the dry weight of the active material. Also, unless otherwise stated, weight percentages are given as weight percentages of the total aqueous composition before drying. Commercial products may contain water addition to the active material. The coatings of this invention are compounded as aqueous solutions. As indicated above, water may therefore comprise up to about 90 percent by weight of the composition before drying.

A further understanding of the nature and advantages of the invention described herein may be realized by reference to the remaining portions of the specification.

DETAILED DESCRIPTION

The present invention provides an improved method and composition for an activated plastic surface from soiling, oxidation, and mechanical damage. In particular, this invention provides for coating compositions that may be applied to activated plastic surfaces and thereby afford the surfaces protection from oxidation or other chemical reactions, soiling, and mechanical damage until the surface is overcoated. Coating may be easily removed by mechanical means (e.g. peeling or scraping) or simply by washing with water prior to the overcoating step.

Because the activated surface is protected from soiling, unwanted chemical reactions and mechanical damage, use of the coatings of the present invention affords a longer holding period between the surface activation and the subsequent overcoating steps. This permits the storage or stockpiling of activated components between activating and overcoating steps and thereby allows efficient batching of activation and overcoating processes. In addition, because the coatings prevent further contamination of the activated surface by soiling agents such as dirt, oil, grease and the like, and also affords mechanical protection to the surface, use of the coatings of the present invention affords a pristine activated surface to the subsequent overcoating step.

As used herein an "activated surface" refers to a surface that has been modified to increase its reactivity and/or wettability with an overcoating composition. Means of activating plastics are well known to those of skill in the art and include, but are not limited to corona discharge, radiofrequency exposure, microwave exposure, plasma treatment, microwave-plasma treatment and various chemical methods. Activation typically introduces new functional groups or modifies existing functional groups. For example, activation by corona discharge involves the production of ozone by a corona which, in turn, oxidizes the plastic surface producing reactive groups such as alcohols, phenols, carboxyls, and the like. In general, activation renders the surface readily wettable by the subsequent overcoating. Various activated plastics include, but are not limited to activated polypropylene, ABS, polyethylene, polyolefins, ABS, and the like.

The methods and compositions of the present invention produce a substantially continuous film which adheres well to an activated plastic surface. By "substantially continuous film" it is intended to mean herein a film generally lacking pinholes through which water, oil, paint, dust, or other materials could reach the underlying surface. Further, the material can be removed easily from the surface to be protected after use with a water wash, or by mechanical means such as scraping or peeling, or by combinations of these methods. In addition, because the material is fully biodegradable, it may be simply disposed of (e.g., washed down a sewer) with no substantial environmental impact.

A preferred method of protecting activated surfaces according to this invention includes steps of applying the coating compositions to the surface to be protected in a substantially continuous film. The compositions are then dried to form a coating that protects the underlying surface from oxidation, soiling, or mechanical damage from various handling operations. The coating may be subsequently removed from the surface by simply washing with water when it is no longer required. In a particularly preferred embodiment, the coatings of the present invention are used to protect components of automobiles such as bumpers and the like, prior to application of a finish such as a metallic plating or an acrylic paint.

In one embodiment, the coatings of this invention include a film former, a plasticizer, and water. Suitable film formers include dextrins, starches, cellulose, derivatized starches and derivatized cellulose (e.g. hydroxyethyl cellulose, carboxymethyl cellulose, hydroxypropyl cellulose, etc.). Various film formers may be used alone or in combination with each other. Starches may be from any source, natural or hybrid and include, but are not limited to starches and derivatized starches from potatoes, manioc, corn, wheat, rice and the like. Derivafized starches include starches starches modified physically as by cooking-extrusion or heat extrusion and/or chemically by oxidation, alkalinization, esterification and etherification. However, as used herein, the term derivatized starches is not intended to include dextrins.

Dextrins are widely known as products of the hydrolysis of starch, often by amylases or acid hydrolysis. More specifically, dextrins are polymers of D-glucose, characterized by an $\alpha(1\rightarrow 4)$ linkage, which are intermediate in complexity between starch and maltose. The viscosity of dextrins, in aqueous solution, varies depending on dextrin length and degree of branching. However, compared with the original starch, dextrins produce aqueous solutions of lower viscosity. Commercially available dextrin typically comprises a mixture of higher viscosity and lower viscosity dextrins. As used herein, the term "dextrin" refers to that combination of higher and lower viscosity dextrins as would be obtained in a typical commercial preparation such as Amaizo 1895, 1890, and 1885 (corn dextrins produced by American Maize Products Co.), Averex 36 LAC 14 (potato dextrin produced by Avebe America, Inc., Princeton, N.J., USA), Amiogum 35, and the like.

While starches and celluloses provide suitable film-formers for the protective coatings of the present invention, where the coatings use a high concentration of solids (typically greater than 10%, by weight, of the total composition) dextrins are particularly preferred. The dextrins, and the other film formers utilized in the films of the present invention act as both film formers and thickeners. The use of high concentrations of dextrins allow the buildup of a thick coating which nevertheless shows relatively low viscosity, good coating properties and an extremely rapid drying time.

In contrast, the unmodified starch-based compositions typically cannot achieve high solids concentrations comparable to that obtainable with dextrins. Underivatized starches form highly viscous aqueous solutions that tend to gel at a solids concentration substantially lower that observed for dextrins. The unmodified starch compositions have a higher water content when applied and dry to a thinner film. Prior to the present invention, it was unknown and unsuspected that the use of dextrins would overcome this limitation and form the basis of an effective coating for the protection of a surface.

In addition, it was a unexpected discovery that the compositions of the present invention would provide coatings compatible with activated plastic surfaces. Prior to the present invention it was expected that contact of the activated surface with other compositions would lead to a reaction between the activated groups comprising the plastic surface and the contacting composition thereby effectively neutralizing the activated surface. Thus, it was a surprising discovery that the use of coating compositions of the present invention provides protective compositions that afford a high degree of protection to activated surfaces protecting them from both chemical contamination (e.g. oxidation and soiling) and mechanical damage (e.g. scouring, gouging, impact or abrasion). In addition, the dextrin-containing compositions show exceptional coating, film forming, and drying properties when applied to activated surfaces.

Preferred dextrins have a viscosity ranging from about 12 to about 20 seconds, more preferably from about 12 to about 15 seconds, and most preferably about 12 seconds in an aqueous solution comprising 40 percent solids (dextrins), as measured using a number 3 Zahn cup. When measured as an aqueous solution comprising about 50 percent solids (dextrin) a most preferred dextrin has a viscosity ranging from about 95 to about 100 centipoise. One such preferred dextrin is an off-specification Amaizo 1895 designated Amaizo 2686N dextrin, available from American Maize Products, Co.). In another embodiment, a preferred dextrin is Avedex 36 LAC 14, available from Avebe America Inc. (Princeton, N.J., USA).

While the "Amaizo" dextrins are derived from maize, dextrins derived from other sources are also suitable. These include native dextrins of any origin, synthetic, natural or hybrid, derived, for example from potatoes, manioc, corn, waxy corn, corn with high amylose content, wheat, rice, and the like.

The quantity of dextrin in the coating composition may be optimized for a particular application. This is accomplished empirically. Generally where it is desired that the composition dry to provide a thicker final coating more solids (dextrin) are added to the composition. However, the upper limits to dextrin concentration are dictated by the resulting viscosity of the composition. The viscosity of the wet coating must be low enough to permit application to and continuous coating of the surface. Thus, in order to produce a thick coating one increases the solids concentration, but not beyond a point where the composition becomes difficult or impossible to apply. Conversely, where a thin coating is desired, the solids composition may be decreased, but not to a point where the composition fails to form a continuous protective coating when dried.

To some extent, the optimal solids content of the mixture is a function of the application method. It is expected that the composition may be applied by a variety of methods known to those of skill in the art. These methods include, but are not limited to painting, dipping, spraying, reverse roller coating, and the use of doctor bars. One of skill in the art will appreciate that application by spraying will generally require a composition of lower viscosity than application by the use of doctor bars. Thus a composition intended for application by spraying may contain a lower solids concentration than a composition applied by dipping or doctoring.

Where thick coatings are desired, the coating material preferably contains a high concentration of solids. In a particularly preferred embodiment, the film former (e.g. dextrin) may comprise from about 5 percent to about 60 percent, preferably from about 10 percent to about 50 percent, more preferably from about 20 to about 40 percent, and most preferably about 40 percent, by weight, of the total composition.

The coatings of the present invention may also include a plasticizer to provide toughness and flexibility and in particular to prevent cracking of the film during drying and subsequent handling. Suitable plasticizers are well known to those of skill in the art and include, but are not limited to glycerine, urea, triethylene glycol, polyethylene glycol, and other water soluble plasticizers. These plasticizers may be used alone, or in combination with each other.

Particularly preferred plasticizers are glycerine or glycerine derivatives such as glycerine monostearate, glycerine monooleate, or acetins (acetate esters of glycerine). The optimum amount of glycerine, or other plasticizer varies with the solids (e.g. dextrin) concentration of the coating composition. Typically higher solids concentrations also require higher plasticizer concentrations in order to prevent cracking of the film. Conversely, where glycerine, or other plasticizer, concentrations are too high, the coating composition will tend to form a sticky or tacky film upon drying. To the extent tackiness is tolerable, plasticizer concentrations may be left high. However, generally a non-tacky film is preferred. In addition, force-dried coatings (e.g. coatings dried by heating) typically require higher plasticizer concentrations to avoid cracking than air-dried coatings.

In a preferred embodiment, the plasticizer will preferably range from about 1 percent to about 50 percent, more preferably from about 15 percent to about 40 percent, and most preferably about 30 percent, by weight, of the total composition. Where the protective coating composition contains about 10% dextrin, about 1.5% glycerine is most preferred, while coating compositions comprising about 40 percent dextrin preferably contain about 30 percent glycerine. Where urea is used as a plasticizer, concentrations will run about three times higher than for glycerine.

In order to prevent cracking, the coatings of the present invention that are force dried typically require a higher plasticizer concentration than the coatings that are simply air dried. Thus, coatings that are simply air-dried may contain plasticizer in concentrations near the lower end of the ranges provided above.

In another embodiment, the composition may include a thickener. The thickener may be utilized to regulate the viscosity and film thickness of the protective coating composition. Particularly where a high degree of mechanical protection is desired, the coating is applied at greater thicknesses and may contain thickeners.

Preferred thickeners show little or no water sensitivity. Thus silicone based thickeners are particularly suitable for this invention. Acrylic thickeners selected for low water sensitivity (e.g., Carbopol® EP1) are also suitable, as are associative thickeners. Alkali-swellable acrylic emulsion thickeners capable of imparting shear-thinning characteristics (e.g., Carbopol® EP1) are particularly preferred for use in this invention. Particularly preferred thickeners include acrylic polymer emulsions (e.g. EP1) or hydroxyethyl cellulose. The thickener may be present at about 0.1 to 3 percent, more preferably at about 0.3 percent to about 1 percent, and most preferably at about 0.6 percent, by weight, of the composition.

It was a surprising discovery and important advantage of the present invention that the compositions of the present invention are able to fully wet activated plastic surfaces without the presence of a wetting agent or surfactant. Elimination of the surfactant in compositions that protect activated plastics is particularly advantageous because many surfactants tend to neutralize or decrease the degree of activation of the plastic surface. Without being bound to a particular theory, it is believed that many surfactants, particularly some non-ionic surfactants produce free radicals that react with the activated sites on the plastic surface resulting in a general loss of reactivity and consequent "deactivation" of the surface.

In some circumstances, however, for example where the activated surface is particularly hydrophobic or where a coating composition with particularly low solids concentration is desired, it may be desirable to incorporate a wetting agent or surfactant in the protective coating compositions of the present invention. In preferred embodiments, the surfactant will include nonionic alkyl aryl surfactants such as Triton™ CF-10 and CF-12 (Rohm & Haas, Philadelphia, Pa., U.S.A.). Also suitable is Triton™ X-100 and surfactants having fluorinated alkyl chains such as Fluorad™ products sold by Minnesota Mining and Manufacturing (St. Paul, Minn., U.S.A.) and Zonyl™ products sold by DuPont Company (Wilmington, Del., U.S.A.) are also suitable. In addition, many embodiments include polyethoxy adducts or modified (poly)ethoxylates such as Triton™ DF-12 and DF-16 sold by Union Carbide (Danbury, Conn., U.S.A.). Other surfactants include nonylphenoxypolyethanol (such as IGEPAL CO-660 made by GAF), polyoxyalkylene glycol (such as Macol™ 18 and 19 made by Mazer Chemicals), acetylenic diol-based surfactants (such as Surfynol™ 104A made by Air Products), and the like. Where a surfactant is present, preferred compositions include up to 2 percent surfactant. More preferred compositions include less than about 1 percent, by weight, surfactant, while most preferred compositions include about 0.1% surfactant.

Where surfactants are included, preferred surfactants for use in the protective coating compositions of the present invention should have certain beneficial properties. For example, they should reduce the surface tension of the composition to a sufficiently low value that a level film, free of pinholes, is laid down. In most instances the surfactant will reduce the surface tension of the masking composition to at most about 25 dynes per centimeter, and more preferably to at most about 20 dyne/cm. To avoid formation of pinholes, the surfactant should not foam. Further, the surfactant should work with a variety of activated surfaces including most activated plastics. Still further preferred surfactants will be relatively inexpensive, will provide a product that does not spot, streak, or frame (i.e., evaporate faster at edges such as molding and/or trim) on the surface to be protected. Finally, the surfactant should be water soluble and otherwise compatible with the other components of the protective coating composition so that the composition does not separate and leave pinholes when dry.

The surfactant should preferably be able to dramatically lower the surface and interfacial tensions of the masking composition. Compositions having very low surface tensions also tend to produce many fewer pinholes in the coating. Thus, any of the known classes of very low surface tension surfactants are preferred for use with this invention. One such class is the alkoxylates of fluorinated alkyl chains. Other functional derivatives (e.g., esters, sulfonates, carboxylates, ammonium compounds, etc.) of fluorinated alkyl chains also tend to produce low surface tension aqueous solutions. In general, replacement of hydrogens on an alkyl group by fluorine atoms leads to surfactants of unusually low surface tension. The above mentioned "Fluorads" and "Zonyls" are examples of surfactants having fluorinated alkyl chains.

The total surfactant in the material may include two or more different surfactants. In some embodiments, a "bulk" surfactant from a different chemical class will be admixed with one or more fluofinated surfactants to promote low interfacial tension and good rewetting properties. Preferred bulk surfactants will allow the protective coating to be rinsed off easily without spotting or streaking the underlying protected surface. Preferred bulk surfactants will produce very little or no foam during application or rinsing. They should also be relatively inexpensive. Suitable bulk surfactants include various compounds such as polyethoxylates and, in one case, octylphenoxypolyethoxyethanol. A particularly preferred bulk surfactant for use with Fluorad™ FC 171 and Fluorad™ FC 430 is Triton DF-16, a nonionic polyethoxylate or Turkey Red (Acrysol 75).

It has been discovered that a particularly preferred coating composition comprises about 0.05 percent, by weight, fluorinated surfactant (e.g. Fluorad) and about 0.05 percent, by weight, bulk surfactant (e.g. sodium dioctyl sulfosuccinate). However, any combination of compatible surfactants that produce sufficient leveling on a given surface can be used. Particularly preferred compositions will provide a level film on a variety of different surfaces and will not spot, streak or frame when the film is rewetted.

It has been found that for general purposes, a superior protective coating composition includes a film-former, a plasticizer, and water and lacks a surfactant. The dextrin ranges from about 5 to about 60 percent, preferably from about 10 to about 50 percent, more preferably from about 20 to about 40 percent, and most preferably about 30 percent, by weight, of the total composition. The plasticizer preferably ranges from about 1 to about 50 percent, more preferably from about 15 to about 40 and most preferably about 30 percent, by weight, of the total composition. The remainder is typically water.

In one particularly preferred embodiment, the composition includes about 10 percent, by weight, film-former, more preferably dextrin, about 1.5 %, by weight glycerine, and remainder water. In a second preferred embodiment, the composition includes about 40 percent, by weight film-former, more preferably dextrin, about 30 percent, by weight glycerine, and remainder water.

These compositions may additionally include a thickener. The thickener preferably amounts to about 0.1 to about 2.0 percent, more preferably about 0.3 to about 1.0 percent, and most preferably about 0.6 percent, by weight, of the total composition. In a preferred embodiment the thickener is either hydroxyethyl cellulose (e.g. Cellosize™) or acrylic polymer emulsion (e.g. EP1) at about 0.6 percent, by weight of the total composition.

In yet another preferred embodiment, the composition includes a surfactant in addition to the thickener. The surfactant is preferably present in an amount up to about 2 percent, more preferably up to about 1 percent, and most preferably about 0.1 percent, by weight of the total composition.

The protective coating composition is an aqueous solution and therefore includes a substantial amount of water before drying. A variety of other materials may also be included in the coatings to confer specific additional properties. Thus, for example, the coating compositions may additionally include lecithin to reduce surface tack, dyes or colorants, antioxidants or corrosion inhibitors, ultra-violet inhibitors, flash rust inhibitors and the like. Preferred embodiments may include foam reduction or foam control agents such as FoamMaker™, Bubble Breaker™, and 1 and 2 octanol. Antistatic compounds (preferably water soluble antistatics such as Larostat 264A made by Mazer Chemicals) may be added in preferred embodiments prevent dust from being drawn to the surface. Preferred embodiments may also include sequesterants (typically less than 1%).

The coating solutions are made by conventional means which typically comprise mixing the components of the protective coating material at substantially atmospheric pressure, so as to form a homogeneous solution. Heat may be applied to speed preparation of the coating solution. After formation of a homogeneous solution, the pH may be adjusted, if desired, by means well known to those of skill in the art.

In practice, the plastic surface is activated by any of a number of means known to those of skill in the art including corona discharge, radio frequency exposure, microwave exposure, plasma exposure, microwave plasma, or chemical activation. The activated surface is then rapidly coated with a protective coating composition of the present invention.

The protective coating material is applied by one of a variety of techniques known to those of skill in the art. These include painting, dipping, spraying, reverse roller coating, and the use of doctor bars. Particularly preferred techniques include brushing, dipping, and spraying of the material. In one preferred embodiment the surface to be protected is blown dry of dust and debris. In some cases, additional water may be added for easier application, such as a 10% dilution. Thereafter, the protective coating material is applied with a pressure pot sprayer, preferably first in a thin mist and, thereafter, in a flow coat or thicker substantially continuous film. For some applications, the mist coat will not be necessary. The protective coating material is sprayed primarily on the surface to be protected, although overspray will not pose significant problems since any overspray may be readily removed with, for example, a wet towel or sponge.

In preferred embodiments, the resulting protective coating is applied in a wet coating in a thickness ranging from about 2 microns to about 10 mils, more preferably ranging from about 0.5 to about 4 mils, and most preferably ranging from about 1 to about 2 mils. The protective coating material is typically permitted to dry at atmospheric temperatures and pressures. For a 1 to 2 mil wet thickness coating, such drying will take about 10 minutes at 70° F. and about 50% humidity.

Alternatively, the protective coating composition may be force-dried. Force drying may be accomplished by means well known to those of skill in the art. These include, but are not limited to the application of heat (e.g. radiant heating, oven baking, or hot air blowers), the reduction of air humidity, air movement or any combination of these means. Under forced drying conditions at about 150° F. and about 50% humidity, the same coatings will dry in about 2 minutes.

After drying of the protective coating composition the part is stored and/or shipped and/or handled according to normal procedures. Prior to overcoating the protected coating is removed from the activated surface by any convenient means. Such removal operations may include, for example, peeling or scraping of the material off of the protected surface. However, it is most preferred that the protective coating composition be removed by normal washing with water. Pressure washing with water may be desired in some instances. The material will be removed readily since it is easily miscible or soluble in water. The activated surface is dried, if necessary, and then overcoated.

One of skill in the art will readily appreciate that the steps of activating the plastic surface, applying and drying the protective coating composition, and subsequently removing the protective coating may be easily set up for mass production, as in an assembly line.

EXAMPLES

The following example is intended to illustrate the present invention and is not intended to limit the scope of the invention in any way.

Example 1

Plastic bumpers are activated using a plasma activation protocol. The activated plastic (e.g. TPO, ABS, etc.) bumpers are then spray coated with the coating 1 or coating 2 and allowed to dry. The protected bumpers are subjected to typical vehicle component handling conditions then shipped to a second location where the coatings are then washed off with water. The bumpers are then dried and painted using standard methods.

The coatings covered the bumpers uniformly and dried to form a continuous coating. The dried coatings provided excellent protection from factory dirt and oil, oils transferred by contact with hands, mechanical abrasions and impacts. At the second location, the coatings were easily removed by washing with water providing a pristine surface for subsequent treatment (e.g. painting).

TABLE 1

Composition of protective coating compounds. All percentages are percentages, by weight, of the total composition.

| | Coating 1 | Coating 2 | Coating 3 | Coating 4 | Coating 5 |
|---|---|---|---|---|---|
| Dextrin Amaizo 1895 or Avedex 36 LAC 14 | 10 | 40 | 10 | 10 | 10 |
| Glycerine | 1.5 | 30 | 1.5 | 1.5 | 1.5 |
| Acrylic Polymer Emulsion | — | — | 0.6 | — | 0.6 |
| Carbopol ® EP1 | | | | | |
| Hydroxyethyl cellulose Cellosize ™ | — | — | — | 0.6 | — |
| Sodium Dioctyl Sulfosuccinate | — | — | — | — | 0.05 |
| 3M Fluorad | — | — | — | — | |
| FC 171 | | | | | 0.03 |
| FC 130 | | | | | 0.02 |
| Water | 88.5 | 30.0 | 87.9 | 87.9 | 87.8 |

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference.

What is claimed is:

1. A method of temporarily protecting an activated plastic surface, said method comprising the steps of:

applying to said surface a surface protective coating composition, said coating composition comprising:

a film former selected from the group consisting of a dextrin, a cellulose, and a cellulose derivative;

a plasticizer; and water;

said step of applying resulting in a substantially continuous film of said composition; and removing said substantially continuous film by washing when protection is no longer desired.

2. The method of claim 1, wherein:

said film former is present at about 5% to about 60%, by weight, of the total composition; and said plasticizer is present at about 1% to about 50%, by weight, of the total composition.

3. The method of claim 2, wherein:

said film former is dextrin present at about 40%, by weight, of the total composition; and said plasticizer is present at about 30%, by weight, of the total composition.

4. The method of claim 3, wherein said plasticizer is glycerine.

5. The method of claim 2 wherein:

said film former is dextrin present at about 10%, by weight, of the total composition; and said plasticizer is present at about 1.5%, by weight, of the total composition.

6. The method of claim 5, wherein said plasticizer is glycerine.

7. The method of claim 1, wherein said composition further comprises a thickener.

8. The method of claim 7, wherein said thickener is present at about 0.1% to about 2 %, by weight, of the total composition.

9. The method of claim 8, wherein said plasticizer is glycerine, and said thickener is an acrylic polymer emulsion.

10. The method of claim 8, wherein said plasticizer is glycerine, and said thickener is a hydroxyethyl cellulose.

11. The method of claim 7, wherein said composition further comprises a surfactant.

12. The method of claim 11, wherein said surfactant is present at up to about 2%, by weight, of the total composition.

13. The method of claim 13, wherein said surfactant comprises about 0.1 percent of the total composition and about 50% of the surfactant is a fluorinated surfactant.

14. A method of temporarily protecting an activated plastic surface, said method comprising the step of applying to said surface a surface protective coating composition, said coating composition comprising:

a film former selected from the group consisting of a starch or a derivatized starch;

a plasticizer; and water; said step of applying resulting in a substantially continuous film of said composition.

15. The method of claim 14, wherein:

said film former is present at about 5% to about 60%, by weight, of the total composition; and said plasticizer is present at about 1% to about 50%, by weight, of the total composition.

16. The method of claim 15, wherein:

said film former is present at about 10%, by weight, of the total composition; and said plasticizer is present at about 1.5%, by weight, of the total composition.

17. The method of claim 16, wherein said plasticizer is glycerine.

18. The method of claim 14, wherein said composition further comprises a thickener.

19. The method of claim 18, wherein said thickener is present at about 0.1% to about 2%, by weight, of the total composition.

20. The method of claim 19, wherein said plasticizer is glycerine, and said thickener is an acrylic polymer emulsion.

21. The method of claim 18, wherein said composition further comprises a surfactant.

* * * * *